United States Patent
Kato

(10) Patent No.: US 11,836,554 B2
(45) Date of Patent: Dec. 5, 2023

(54) IMAGE PROCESSING APPARATUS, IMAGE PROCESSING METHOD, AND STORAGE MEDIUM WITH GENERATION OF CORRECTION TARGET VALUE BASED ON PRINT DENSITY

(71) Applicant: CANON KABUSHIKI KAISHA, Tokyo (JP)

(72) Inventor: Minako Kato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/860,282

(22) Filed: Jul. 8, 2022

(65) Prior Publication Data
US 2023/0028103 A1  Jan. 26, 2023

(30) Foreign Application Priority Data
Jul. 15, 2021 (JP) ................ 2021-116925

(51) Int. Cl.
G06K 15/10 (2006.01)
G06K 15/02 (2006.01)

(52) U.S. Cl.
CPC ......... *G06K 15/102* (2013.01); *G06K 15/027* (2013.01); *G06K 15/186* (2013.01)

(58) Field of Classification Search
CPC .................................... G06K 15/102
USPC ........................................ 358/1.8
See application file for complete search history.

(56) References Cited

U.S. PATENT DOCUMENTS

| | | | |
|---|---|---|---|
| 6,292,621 B1 | 9/2001 | Tanaka et al. | |
| 7,432,985 B2 | 10/2008 | Ishikawa et al. | |
| 9,135,523 B2 | 9/2015 | Kato et al. | |
| 10,592,791 B2 | 3/2020 | Kato | |
| 2007/0206041 A1* | 9/2007 | Yamanobe | B41J 2/2125 347/15 |
| 2009/0213431 A1* | 8/2009 | Miyamoto | H04N 1/6033 358/3.03 |
| 2014/0139854 A1* | 5/2014 | Saito | H04N 1/4015 358/1.9 |
| 2020/0130353 A1* | 4/2020 | Moribe | B41J 2/195 |
| 2021/0094314 A1* | 4/2021 | Moribe | G06K 15/027 |

FOREIGN PATENT DOCUMENTS

JP   2004-168000 A   6/2004

* cited by examiner

*Primary Examiner* — Jacky X Zheng
(74) *Attorney, Agent, or Firm* — Venable LLP

(57) ABSTRACT

A first set correction target value set for a correction target value generation region including a unit region corresponding to one or more nozzles is updated based on a difference between the first set correction target value and a print density in the unit region corresponding to the correction target value generation region. Also, a second set correction target value set for a correction target value generation region being adjacent to an updated region which is a correction target value generation region updated in the correction target value and having yet to be updated in the correction target value is updated based on a difference between the second set correction target value and the correction target value of the updated region.

17 Claims, 15 Drawing Sheets

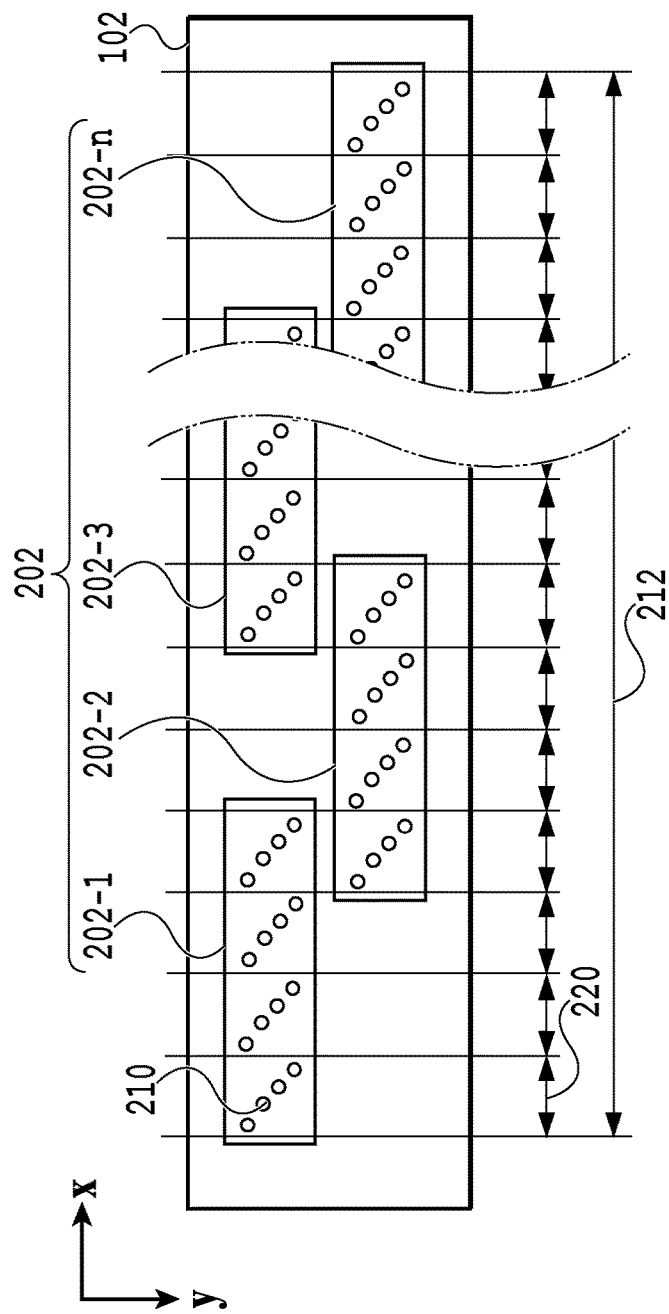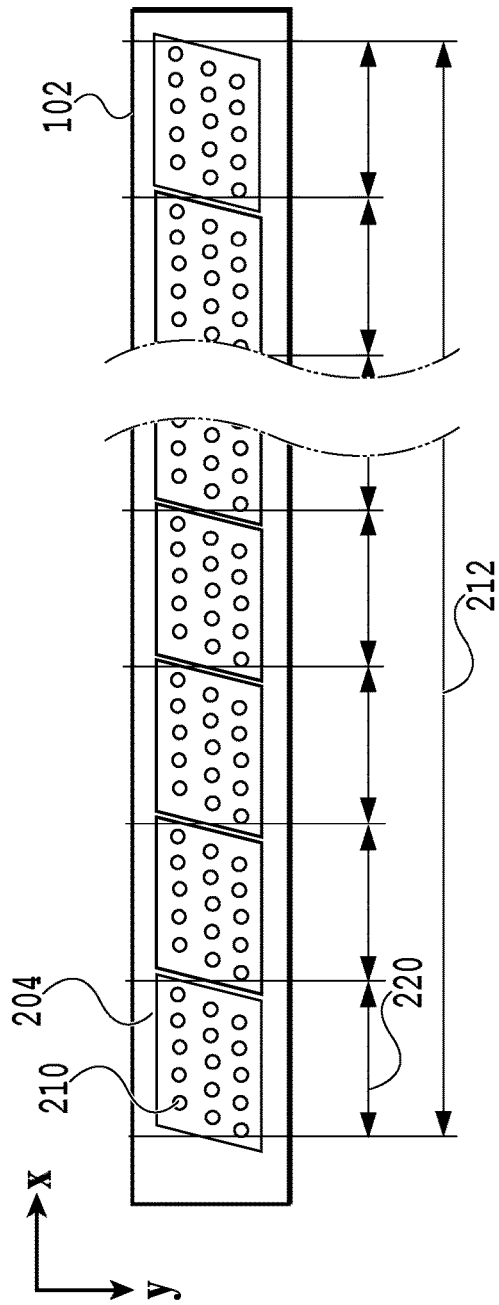
FIG.2A
FIG.2B

REGIONS 1 TO 5: CORRECTION TARGET VALUE GENERATION REGION

| RANK | RANGE OF COLOR DIFFERENCE ΔE | LEVEL OF COLOR DIFFERENCE PERCEPTIBILITY |
|---|---|---|
| TOLERANCE RATING "AAA" | 0.4~0.8 | LIMIT TO BE ABLE TO SET STRICT ACCEPTABLE COLOR DIFFERENCE STANDARD IN VIEW OF REPRODUCIBILITY BASED ON VISUAL DETERMINATION |
| TOLERANCE RATING "AA" | 0.8~1.6 | LEVEL WHERE SLIGHT COLOR DIFFERENCE CAN BE SENSED WITH COLORS COMPARED BEING ADJACENT TO EACH OTHER |
| TOLERANCE RATING "A" | 1.6~3.2 | LEVEL WHERE COLOR DIFFERENCE IS ALMOST UNNOTICEABLE WITH COLORS COMPARED BEING APART FROM EACH OTHER |
| TOLERANCE RATING "B" | 3.2~6.5 | RANGE WHERE COLORS CAN BE REGARDED AS SAME COLOR ON IMPRESSION LEVEL |

FIG.13

IMAGE PROCESSING APPARATUS, IMAGE PROCESSING METHOD, AND STORAGE MEDIUM WITH GENERATION OF CORRECTION TARGET VALUE BASED ON PRINT DENSITY

BACKGROUND OF THE INVENTION

Field of the Invention

The present invention relates to an image processing apparatus, an image processing method, and a storage medium for generating print data used to print an image on a print medium using a plurality of nozzles with the print medium moving relative to the plurality of nozzles.

Description of the Related Art

Head shading and color shading are techniques known as techniques for correcting density unevenness, color unevenness, and the like due to the ink ejection characteristics of a plurality of nozzles in a print head capable of ejecting ink from the nozzles using the inkjet method. In these techniques, for a region where the ejection amount based on an ejection characteristic is outside a predetermined range, the number of dots to be printed in that region is increased or decreased to correct a difference in density, color, or the like between the region and a region where the ejection amount is within the predetermined range.

Note that for a region where the ejection amount based on an ejection characteristic is outside the predetermined range greatly, the number of dots printed is changed greatly by the head shading technique. This results in a large difference between a dot pattern printed on the region where the ejection amount is outside the predetermined range and a dot pattern printed on a region where the ejection amount is within the predetermined range, and such a dot pattern difference may be visually recognized as unevenness in spatial frequency. As a technique for solving such a problem, for example, Japanese Patent Laid-Open No. 2004-168000 discloses a technique for reducing unevenness in spatial frequency by using dots of small size and dots of low density ink.

However, in the technique disclosed by Japanese Patent Laid-Open No. 2004-168000, the print head needs to include nozzles capable of ejecting small-size dots and needs to be able to eject ink of low density, and therefore this technique cannot be applied to a print head that does not have such a configuration.

SUMMARY OF THE INVENTION

The present invention has been made in view of the above problem, and provides a technique that can reduce unevenness due to variance in printing characteristics including variance in ejection characteristic between a plurality of nozzles in a print head, regardless of the configuration of the print head.

In the first aspect of the present invention, there is provided an image processing apparatus including:
  an obtainment unit configured to obtain a print density in a unit region corresponding to one or a plurality of nozzles that eject ink, the print density being based on print characteristics; and
  a correction target value generation unit configured to generate a correction target value based on the print density obtained by the obtainment unit, the correction target value serving as a target density value in generating a correction value for use in head shading processing, wherein
  the correction target value generation unit performs
  first update to update a first set correction target value set for a correction target value generation region including the unit region, based on a difference between the first set correction target value and the print density in the unit region corresponding to the correction target value generation region and
  second update to update a second set correction target value set for the correction target value generation region being adjacent to an updated region which is the correction target value generation region updated in the correction target value and having yet to be updated in the correction target value, based on a difference between the second set correction target value and a first updated correction target value which is the updated correction target value of the updated region.

In the second aspect of the present invention, there is provided an image processing method in which a correction target value serving as a target density value in generating a correction value for use in head shading processing is generated based on a print density in a unit region corresponding to one or a plurality of nozzles that eject ink, the print density being based on print characteristics, the image processing method including:
  updating a first set correction target value set for a correction target value generation region including the unit region, based on a difference between the first set correction target value and the print density in the unit region corresponding to the correction target value generation region; and
  updating a second set correction target value set for the correction target value generation region being adjacent to an updated region which is the correction target value generation region updated in the correction target value and having yet to be updated in the correction target value, based on a difference between the second set correction target value and a first updated correction target value which is the updated correction target value of the updated region.

In the third aspect of the present invention, there is provided a non-transitory computer readable storage medium storing a program for causing a computer to function as an image processing apparatus, the image processing apparatus including:
  an obtainment unit configured to obtain a print density in a unit region corresponding to one or a plurality of nozzles that eject ink, the print density being based on print characteristics; and
  a correction target value generation unit configured to generate a correction target value based on the print density obtained by the obtainment unit, the correction target value serving as a target density value in generating a correction value for use in head shading processing, wherein
  the correction target value generation unit performs
  first update to update a first set correction target value set for a correction target value generation region including the unit region, based on a difference between the first set correction target value and the print density in the unit region corresponding to the correction target value generation region and
  second update to update a second set correction target value set for the correction target value generation region being adjacent to an updated region which is the correction target value generation region updated in the correction target value and having yet to be updated in the correction target value, based on a difference between the second set correction target value and a first updated correction target value which is the updated correction target value of the updated region.

The present invention can reduce unevenness due to variance in printing characteristics including variance in ejection characteristic between a plurality of nozzles in a print head, regardless of the configuration of the print head.

Further features of the present invention will become apparent from the following description of exemplary embodiments with reference to the attached drawings.

BRIEF DESCRIPTION OF THE DRAWINGS

FIGS. 2A and 2B are diagrams illustrating an example of a nozzle arrangement in a print head;

FIG. 13 is a diagram showing, for each color difference tolerance, the acceptable range and the level of color difference;

DESCRIPTION OF THE EMBODIMENTS

Exemplar embodiments of an image processing apparatus, an image processing method, and a storage medium are described in detail below with reference to the attached drawings. Note that the following embodiment is not intended to limit the present invention, and not all the combinations of features described in the present embodiment are necessarily essential to the solutions provided by the present invention. Also, the relative position, shape, and the like of each component described in the embodiment are merely examples, and it is not intended to limit the scope of the invention only to them.

Figure 1:
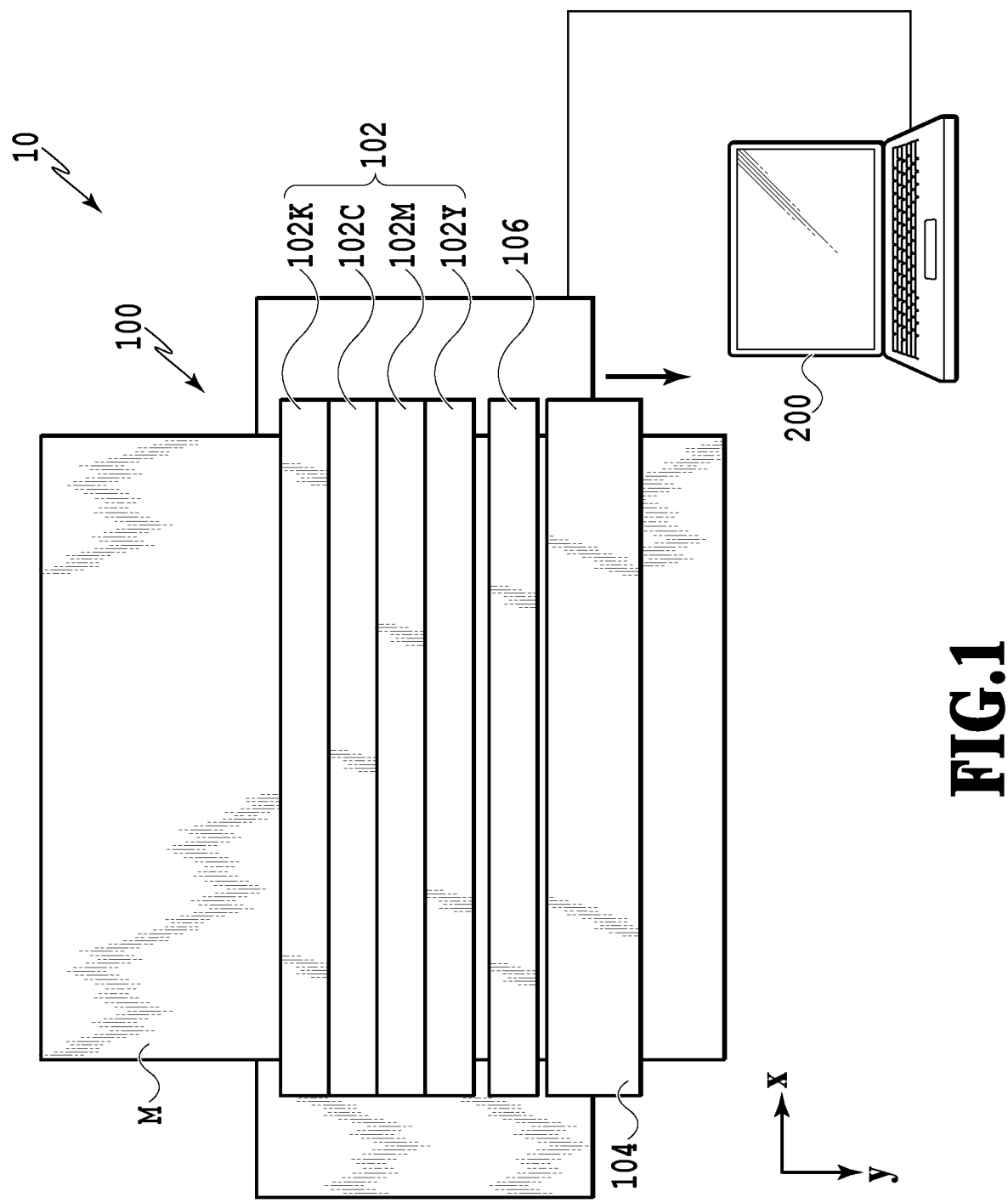
FIG. 1 is a schematic configuration diagram of a printing system including an image processing apparatus of an embodiment.

FIG. 1 is a schematic configuration diagram of a print system including the image processing apparatus of the embodiment. A printing system 10 in FIG. 1 includes a printing apparatus 100 that performs printing by ejecting ink to a print medium and a personal computer (PC) 200 as a host apparatus of the printing apparatus 100. In the present embodiment, the host PC 200 functions as the image processing apparatus.

<Printing Apparatus>

The printing apparatus 100 is a full-line-type inkjet printing apparatus. The printing apparatus 100 includes print heads 102 that perform printing by ejecting ink to a print medium M, a conveyance roller 104 that conveys the print medium M, and a scanner 106 that can scan an image printed on the print medium M.

The print head 102 includes four print heads 102K, 102C, 102M, 102Y arranged side by side in the Y-direction. The print head 102K is located most upstream in the +Y-direction and ejects a black ink (a K ink). The print head 102C is located downstream of the print head 102K in the +Y-direction and ejects a cyan ink (a C ink). The print head 102M is located downstream of the print head 102C in the +Y-direction and ejects a magenta ink (an M ink). The print head 102Y is located downstream of the print head 102M in the +Y-direction and ejects a yellow ink (a Y ink).

Each print head 102 extends in the X-direction intersecting with (in the present embodiment, orthogonal to) the Y-direction and includes nozzle arrays each formed by a plurality of nozzles arranged in the X-direction at a pitch of 1200 dpi to cover a print region extending in the width direction of the print medium M conveyed in the Y-direction. Each nozzle in the print head 102 is a configuration for ejecting a corresponding ink. The printing apparatus 100 includes a supply mechanism for supplying a corresponding ink to each print head 102.

The conveyance roller 104 is rotated by a drive force from a conveyance motor (not shown) and conveys the print medium M in the Y-direction. Note that other than the conveyance roller 104, the printing apparatus 100 is provided with a roller driven by the conveyance motor, so that the print medium M is conveyed by this roller and the conveyance roller 104. The mechanism for conveying the print medium M in the printing apparatus 100 is not limited to the rollers such as the conveyance roller 104, and any of various publicly known techniques can be employed.

While the print medium M is conveyed by the conveyance roller 104 and the like, nozzles in the print heads 102K, 102C, 102M, 102Y eject inks based on print data at a frequency corresponding to the conveyance speed of the print medium M. As a result, ink dots of the respective colors are applied to the print medium M in accordance with the print data, forming an image on the print medium M.

The scanner 106 is provided downstream of the print heads 102 in the +Y-direction, and its scanning region is long enough to cover the print region on the print medium M in the X-direction. Specifically, the scanner 106 has, on its surface to face the print medium M, scanning elements (not shown) arranged at a predetermined pitch in the X-direction. The scanner 106 can scan an image printed on the print medium M conveyed by the conveyance roller 104 and the like, such as an image printed by the print heads 102, and output the image as RGB multi-value data. In the present embodiment, the scanner 106 is used to scan a test pattern printed in head shading (HS) processing. The scanning mechanism in the printing apparatus 100 is not limited to the scanner 106. Specifically, the scanning mechanism can be provided separately from the printing apparatus 100, or may be configured to scan an image printed on the print medium M while moving in the X-direction.

<Print Heads>

FIGS. 2A and 2B are diagrams showing examples of how chips having ink ejecting nozzles formed thereon are arranged in a print head, FIG. 2A being an example where rectangular chips are arranged in a zig-zag manner, FIG. 2B being an example where parallelogramic chips are arranged in a predetermined direction.

Nozzle arrays are formed in each print head 102 on its surface to face the print medium M, the nozzle arrays each having a plurality of ink ejecting nozzles 210 arranged in the X-direction. The length of the nozzle arrays is set to cover the width of the print region on the print medium M in the X-direction.

More specifically, each print head 102 has a plurality of chips 202 having nozzle arrays formed thereon, with neighboring chips being adjacent to each other in the Y-direction and offset from each other so that they partially overlap in the X-direction (see FIG. 2A). Specifically, the chips 202 are rectangular. Then, as to the chip 202-1 located most upstream in the +X-direction and the chip 202-2 adjacent to the chip 202-1, the chip 202-2 is disposed downstream of the chip 202-1 in the +Y-direction such that they overlap partially in the X-direction. As to the chip 202-2 and the chip 202-3 adjacent to the chip 202-2, the chip 202-3 is disposed upstream of the chip 202-2 in the +Y-direction such that they overlap partially in the X-direction. As to the chip adjacent to the chip 202-3 and the rest, the above arrangement is repeated. In other words, the chips 202 are arranged in a zig-zag manner and extend in the X-direction overall. Each chip 202 has four nozzle arrays arranged in the Y-direction, each nozzle array being formed by a plurality of nozzles 210 arranged in the X-direction. The four nozzle arrays are formed such that each downstream nozzle array in the +Y-direction is offset in the +X-direction from its upstream nozzle array by a predetermined amount. Then, the nozzle arrays formed by the chips 202 are configured to be able to print dots on a print region 212 at a pitch of 1200 dpi by selectively performing ejection operations. The length of the print region 212 in the X-direction is set to cover the range printable by the print heads 102 in the X-direction, or in other words, the range where the nozzles are formed in the X-direction.

The chip configuration in the print head 102 is not limited to the mode described above, and may be the chip configuration shown in FIG. 2B. In the print head 102 in FIG. 2B, a plurality of chips 204 having nozzle arrays formed thereon are arranged linearly in the X-direction. Specifically, the chips 204 are parallelogramic. The plurality of chips 204 are arranged in the X-direction without being offset in the Y-direction such that the shorter sides of adjacent chips may be parallel with each other. Each chip 204 has three nozzle arrays arranged in the Y-direction, each nozzle array being formed by a plurality of nozzles 210 arranged in the X-direction. The three nozzle arrays are formed such that each downstream nozzle array in the +Y-direction is offset in the −X-direction from its upstream nozzle array by a predetermined amount. Then, the nozzle arrays formed by the chips 204 are configured to be able to print dots on the print region 212 at a pitch of 1200 dpi by selectively performing ejection operations.

FIGS. 2A and 2B show regions 220 formed by dividing the print region 212. Each of these regions 220 is a region for which to generate a correction target value used in obtaining correction values for use in the HS processing. Details of the region 220, including the correction target value, will be described later. The region 220 will be hereinafter referred to as a correction target value generation region 220.

The printing apparatus 100 is not limited to a full-line-type inkjet printing apparatus, and may be what is called a serial-scan-type inkjet printing apparatus, which performs printing or scanning by moving the print heads or the scanner in the X-direction. Also, the printing apparatus 100 is not limited to the mode in which inks are directly applied from the print heads 102 to the print medium M. Specifically, a mode may be employed in which an ink layer is first formed on an intermediate transfer body and then transferred to the print medium M. Although four different types of ink are used in the printing apparatus 100 as inks printable by the print heads 102, the present invention is not limited to this. One to three or five or more colors of ink may be used.

<Configuration of the Control System of the Printing Apparatus>

Figure 3:
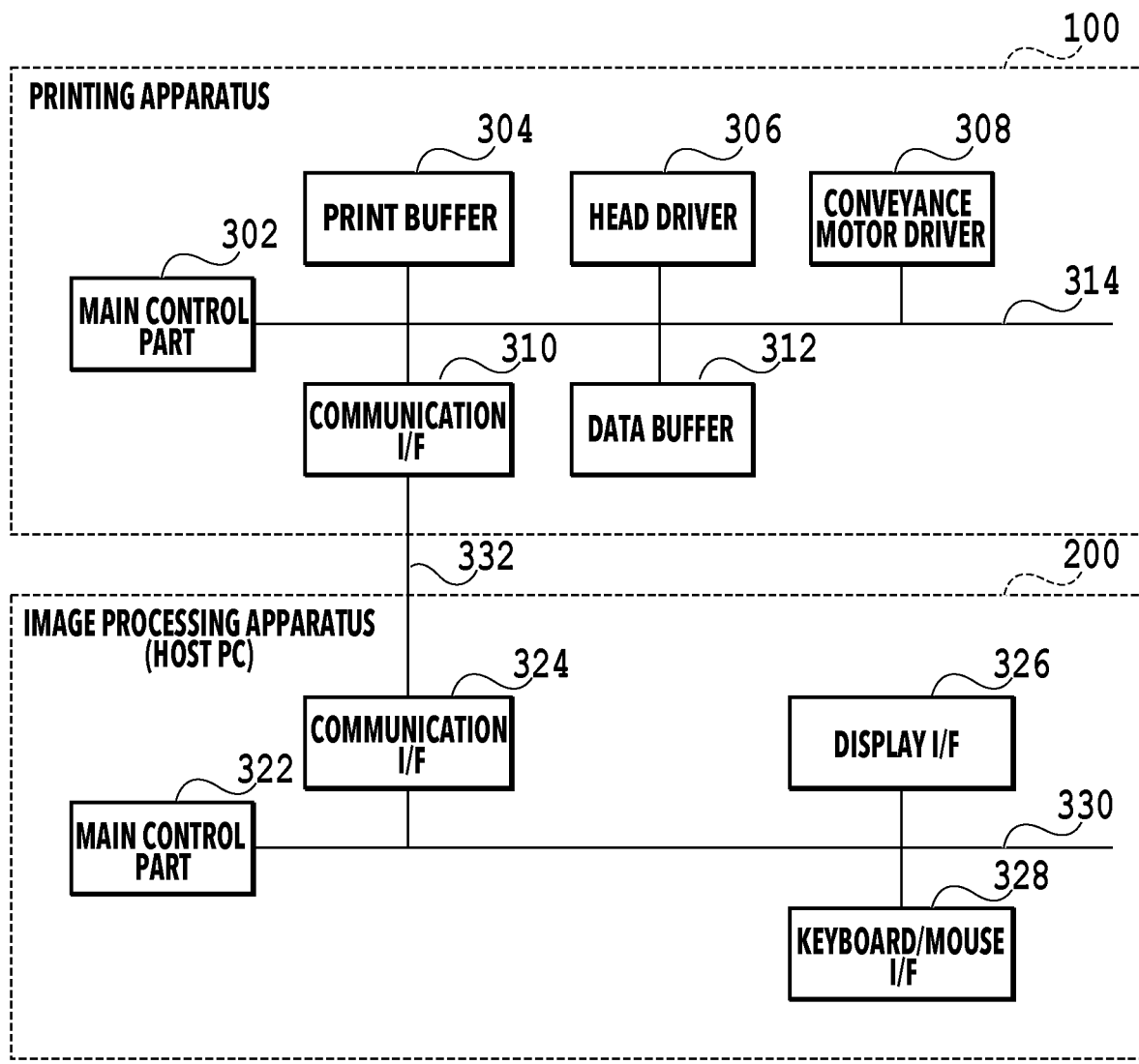
FIG. 3 is a block configuration diagram of control systems of a printing apparatus and of a host PC.

FIG. 3 is a block configuration diagram of control systems of the printing apparatus and the image processing apparatus forming the printing system. Note that FIG. 3 shows main configurations, and the printing apparatus 100 and the host PC 200 as the image processing apparatus may include configurations other than those shown in FIG. 3.

The printing apparatus 100 includes a main control part 302 that performs overall control of the printing apparatus 100. The main control part 302 is formed by, for example, a central processing unit (CPU), a ROM, a RAM, and the like. The printing apparatus 100 includes a print buffer 304 that stores, as raster data, print data before being outputted to the print heads 102 and a head driver 306 that controls the print heads 102. The head driver 306 causes inks to be ejected from the nozzles in accordance with the print data stored in the print buffer 304. The printing apparatus 100 further includes a conveyance motor driver 308 that controls the conveyance motor and a communication interface (I/F) 310 for transmitting and receiving data signals to and from the host PC 200. The printing apparatus 100 further includes a data buffer 312 to temporarily store image data received from the host PC 200. The configurations described above are connected to one another by a system bus 314.

<Configuration of the Control System of the Image Processing Apparatus>

The host PC 200 functioning as the image processing apparatus includes a main control part 322 that can, e.g., create image data, perform various kinds of processing on image data created, and generate information to use for processing to be executed. The main control part 322 is formed by, for example, a CPU, a ROM, a RAM, and the like. The host PC 200 includes a communication I/F 324 for transmitting and receiving data signals to and from the printing apparatus 100. The communication I/F 324 is connected to the communication I/F 310 of the printing apparatus 100 with a signal line 332.

The host PC 200 further includes a display I/F 326 connected to a display (not shown) as a display part and a keyboard/mouse I/F 328 connected to a keyboard (not shown) and a mouse (not shown) as operation parts. Via the display I/F 326, the main control part 322 controls what is displayed on the display. Also, via the keyboard/mouse I/F 328, the main control part 322 receives input of contents of a user operation performed using the keyboard and the mouse. Then, the main control part 322 executes various kinds of processing based on the contents of the operation inputted. The configurations described above are connected to one another by a system bus 330.

<Functional Configuration of the Printing System>

Figure 4:
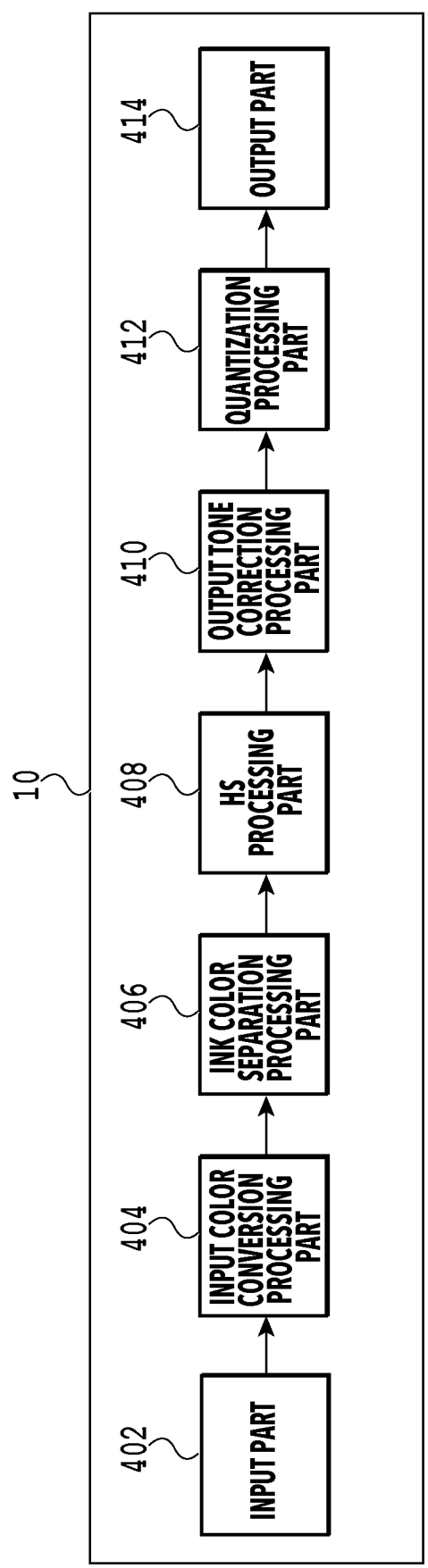
FIG. 4 is a block diagram of a functional configuration related to image processing in a printing system.

Next, the functional configuration of the printing system 10 is described. Note that the following describes a configuration related to image processing for obtaining print data which is binary data representing ejection and non-ejection of ink to each pixel on a print medium, and omits descriptions of the other various publicly known configurations in the printing system 10. FIG. 4 is a block diagram showing the functional configuration of the printing system.

The printing system 10 includes an input part 402 to which image data is inputted and an input color conversion processing part 404 that converts the image data outputted from the input part 402 into image data corresponding to the color space supported by the printing apparatus 100. The printing system 10 further includes an ink color separation processing part 406 that converts color signal values in the image data converted by the input color conversion processing part 404 into color signal values corresponding to the inks used by the printing apparatus 100. The printing system 10 further includes an HS processing part 408 that corrects the image data having the ink color signal values converted by the ink color separation processing part 406, in accordance with the ejection characteristics of the nozzles of the print heads 102.

The printing system 10 further includes an output tone correction processing part 410 that corrects the image data having the color signals values obtained by the HS processing part 408, by adjusting the number of ink dots of each ink color printed. The printing system 10 further includes a quantization processing part 412 that performs quantization processing on the image data having the color signal values obtained by the output tone correction processing part 410 and the output part 414 that outputs binary data (dot data) obtained by the quantization processing to the printing apparatus 100.

Note that the above configuration may be included in the main control part 302 or the main control part 322, or part of the configuration may be included in the main control part 302, and the rest of the configuration may be included in the main control part 322. To facilitate understanding, the following description assumes that the above configuration is included in the main control part 322.

<Image Processing>

In the printing system 10 described above, an image is printed on a print medium M. In this printing system 10, the host PC 200 performs image processing for converting image data into print data printable by the printing apparatus 100, and the printing apparatus 100 performs printing on a print medium based on the print data thus obtained. In the printing system 10, the image processing is started by, for example, a user instruction given via the host PC 200.

Figure 5:
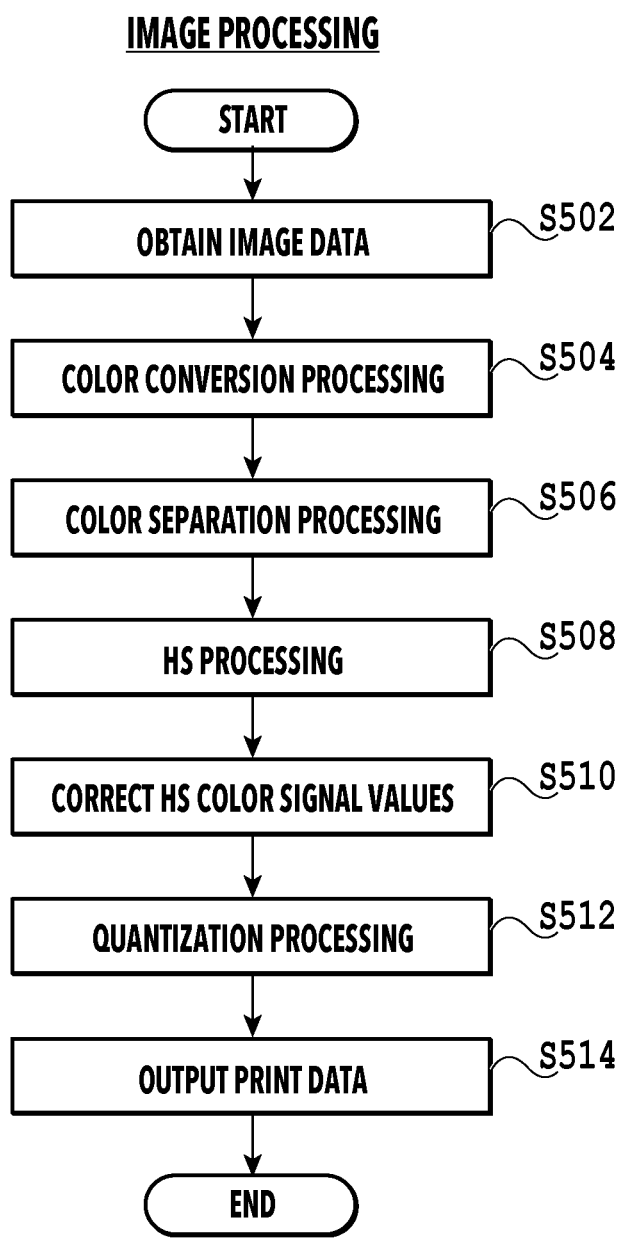
FIG. 5 is a flowchart showing a processing routine of image processing.

FIG. 5 is a flowchart showing a detailed processing routine of the image processing. The series of processing shown in the flowchart in FIG. 5 is performed by the CPU in the main control part 322 by loading program code stored in the ROM into the RAM and executing the program code. Alternatively, some or all of the functions in the steps in FIG. 5 may be executed by hardware such as an ASIC or an electric circuit. Also, the letter S used herein in describing processing means that it is a step in the flowchart showing the contents of the processing. The same applies to the other flowcharts herein.

After the image processing is started, first, the input part 402 obtains image data (S502). Image data created by the host PC 200, another computer, or the like is stored in a storage area in the host PC 200. Thus, the input part 402 obtains the image data stored in the storage area. This image data is 8-bit luminance data represented in R (red), G (green), and B (blue).

Next, the input color conversion processing part 404 performs color conversion processing to convert RGB input signal values in the inputted image data into R', G', B' device color signal values supported by the color space of the printing apparatus 100 (S504). Publicly known techniques using matrix operation processing and a three-dimensional look-up table (LUT) can be used for this conversion.

After that, the ink color separation processing part 406 performs color separation processing to convert the device color signal values converted by the input color conversion processing part 404 into color signal values corresponding to the ink colors used by the printing apparatus 100 (S506). Specifically, since the printing apparatus 100 uses a K (black) ink, a C (cyan) ink, an M (magenta) ink, and a yellow (Y) ink, the device color signal values (R', G', B') are converted into ink color signal values (K, C, M, Y) in S506. Like the R, G, B values, the K, C, M, Y values are each represented by 8 bits. Like S504, publicly known techniques such as a three-dimensional LUT can be used for this conversion.

After the ink color signal values are obtained, next, the HS processing part 408 performs HS processing to correct the ink color signal values in order to reduce unevenness due to variance in the ejection characteristics of the nozzles forming the print heads 102 (S508). In S508, a one-dimensional LUT is used to convert the ink color signal values (K, C, M, Y) and obtain HS color signal values (K', C', M', Y'). After the HS signal values are obtained, next, the output tone correction processing part 410 corrects the image data obtained by the HS processing and having the HS color signal values by adjusting the number of ink dots to be printed for each ink color (S510).

After that, the quantization processing part 412 performs quantization processing on the image data having the color signal values corrected by the output tone correction processing part 410 (S512), and the main control part 322 then ends the image processing as print data generation processing. Publicly known techniques such as error diffusion or dithering can be used as the quantization processing. Note that the quantization level may be binary or multi-level, i.e., three or more levels. In a case of binary, the conversion sets ON (ink ejected) or OFF (ink not ejected) for each pixel. In a case of multi levels (more than three levels), indexing is further used to index each pixel to binary data of ON or OFF of ink ejection. A publicly known technique can be used for the indexing. For example, dot arrangements in accordance with quantization levels are held as a table in advance, and a dot arrangement (a binary value of ON/OFF of ink ejection) is determined based on the quantization level.

Binary data thus obtained by the image processing, i.e., print data, is outputted by the output part 414 to the printing apparatus 100 via the communication I/F 324. In the printing apparatus 100, in response to a user instruction to start printing, printing processing is executed to perform printing on a print medium based on the inputted binary data.

The image processing described above may be modified as follows. Although the image data retained by the input part 402 is data represented in the RGB format above, the present invention is not limited to this. The representation format of each pixel may be the CMYK format or may be the format of color numbers associated with colors represented in an input-independent color space, such as Lab, according to an existing standard. Also, although the bit count in each processing in the image processing is eight above, the present invention is not limited to this and may have more tone levels such as 16 bits. Also, although not particularly described in the above image processing, after the color separation processing in S506 in which ink color signal values are obtained by conversion, processing is performed on each ink color.

In the color conversion processing in S504, an approach may be employed in which the data format of the inputted image data may be converted from one in a device-dependent color space, such as RGB or CMYK, into one in a device-independent color space, such as Lab or XYZ, and then further converted into one in a device-dependent color space. In the color separation processing in S506, the device color signal values are converted into four colors, CMYK, as an example, but the colors into which the device color signal values are converted are not limited to these four colors. For example, in a case where the printing apparatus 100 includes more types of inks, such as a pale-colored ink having a hue equivalent to those of CMYK and having a lower density in order to reduce the pebbly appearance, the ink color conversion is performed to accommodate this. Also, as an ink color, the printing apparatus 100 may include a special color different in hue from the basic colors (CMYK), such as, for example, orange, green, violet, or blue.

<Generation of Correction Values for Use in HS Processing>

Figure 6:
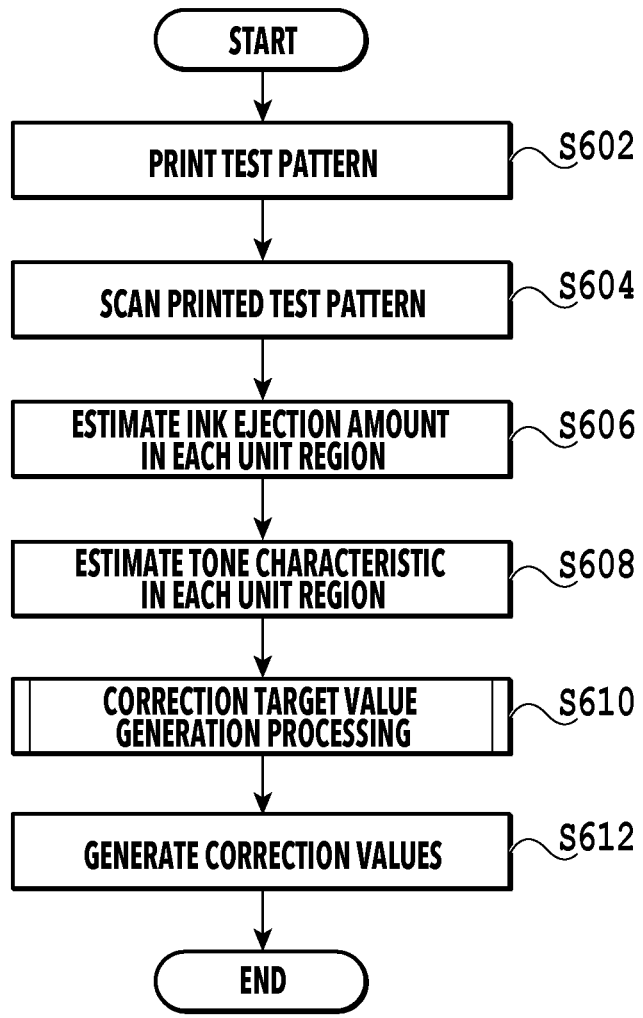
FIG. 6 is a flowchart showing a processing routine of generation processing for generating correction values.

Next, a description is given of generation of correction values for use in HS processing. Specifically, a one-dimensional look-up table which is a conversion table for converting a tone value is generated as a correction value. FIG. 6 is a flowchart showing a detailed processing routine of generation processing for generating correction values for use in HS processing. The series of processing shown in the flowchart in FIG. 6 is performed by the CPU in the main control part 322 by loading program code stored in the ROM into the RAM and executing the program code. Alternatively, some or all of the functions in the steps in FIG. 6 may be executed by hardware such as an ASIC or an electric circuit.

In the generation processing in FIG. 6, first, the main control part 322 causes the printing apparatus 100 to print a predetermined test pattern on the print medium M (S602). The predetermined test pattern is a publicly known pattern for obtaining the ejection characteristics of the nozzles in a unit region (to be described later) for which to obtain a correction value, and is printed on the entire print region 212 in the X-direction. Next, the main control part 322 causes the scanner 106 to scan the printed test pattern (S604). In other words, the main control part 322 controls the printing apparatus 100 to print the predetermined test pattern and scan the printed predetermined test pattern.

After that, the main control part 322 analyzes a scan value in each unit region in the print region 212 and estimates an ink ejection amount in the unit region (S606). Then, based on the estimated ejection amount, a tone characteristic indicating the relation between an input tone and a print density in the unit region is estimated (S608). The unit region is a region for which to obtain a correction value and corresponds to one nozzle or a plurality of nozzles consecutive in the X-direction. Note that this unit region is smaller than a correction target value generation region to be described later in the X-direction.

In the storage area or the like, the host PC 200 retains the correspondence between a signal value(a scan value) scanned by the scanner 106 and the density of ink printed (print density). Thus, by printing and scanning a particular tone pattern, i.e., the predetermined test pattern, a tone characteristic indicative of the correspondence between an input tone and a print density can be estimated.

Figure 7A:
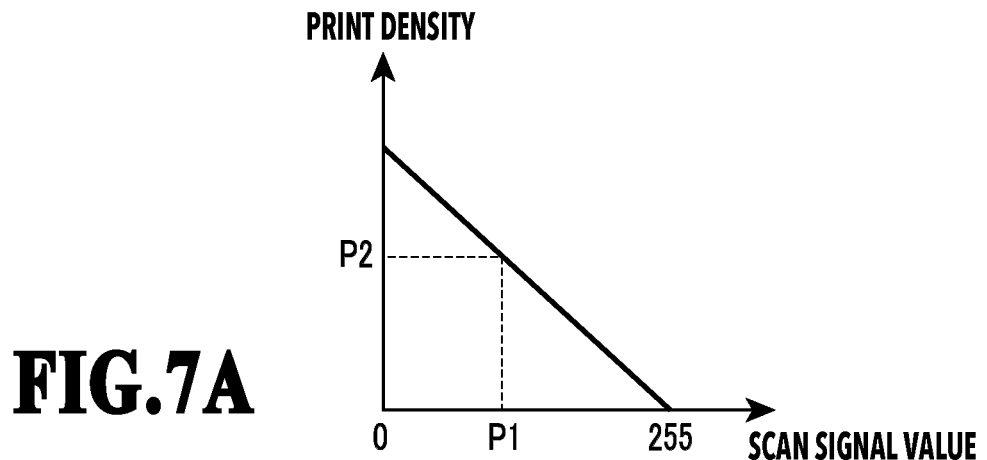
FIGS. 7A to 7C are relation diagrams used in estimating tone characteristics from a scan value.

FIG. 7A is a graph showing the relation between a scan value obtained by the scanner and a print density. In the storage area in the host PC 200, information indicating the correspondence between a scan value obtained by the scanner 106 and a print density, like the one shown in FIG. 7A, is stored. In FIG. 7A, the horizontal axis represents a scan value obtained by the scanner 106, the scan value being a value ranging from 0 to 255. A signal value obtained is "255" in a case where the brightest color assumed is scanned by the scanner 106 and is "0" in a case where the darkest color assumed is scanned by the scanner 106. The vertical axis shows print density. In FIG. 7A, for example, in a case where the scan value is P1 in a unit region, the print density is P2. After the print density in the unit region is thus obtained, next, the amount of ink ejected to the unit region (hereinafter also referred to simply as an "ejection amount") is estimated from the print density obtained.

Figure 7B:
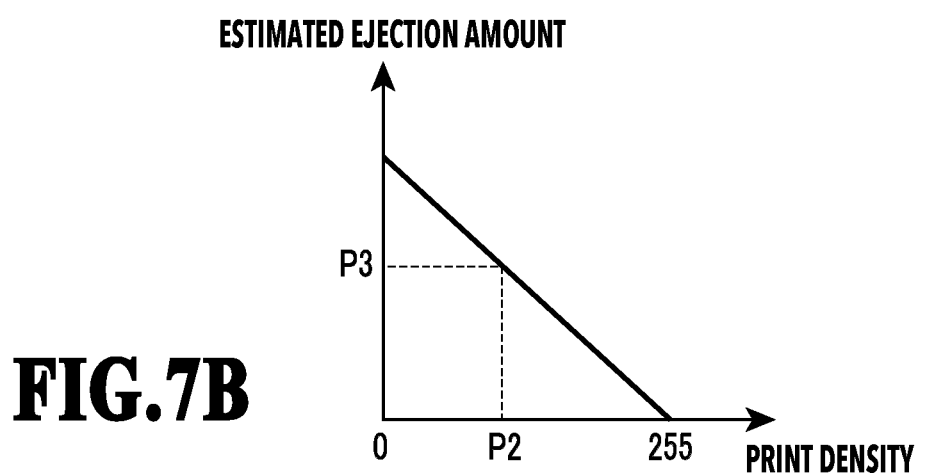

Thus, in S606, a print density is obtained for each unit region from the scan value obtained by the scanner 106, and the amount of ink ejected in the unit region is estimated based on this print density. FIG. 7B is a graph showing the relation between a print density and an ejection amount. Information indicating the correspondence between a print density and an ejection amount is also stored in the storage area in the host PC 200. In FIG. 7B, the horizontal axis represents the print density, and the vertical axis represents the estimated ink ejection amount. In FIG. 7B, in a case where the print density is P2, the estimated ink ejection amount is P3. Thus, in S606, in a case where the scan value from the scanner 106 is P1, P3 is obtained as the estimated ink ejection amount.

Note that in FIG. 7B, the estimated ink ejection amount represented by the vertical axis may be a specific ejection amount value or may be a number indicative of a rank determined in accordance with a set standard. For example, there may be three ranks, high, intermediate, and low, or there may be four or more ranks from high to low, with each rank being associated with the level of estimated ink ejection amount.

Figure 7C:
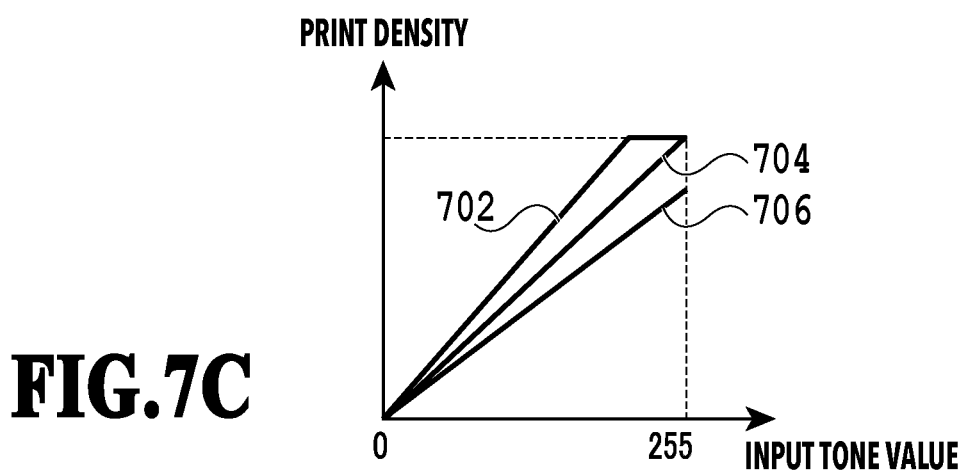

After the estimation of the ink ejection amount, in S608, a tone characteristic is estimated based on the ejection amount. FIG. 7C is a graph showing an example of tone characteristics in accordance with the ejection amount ranks. The tone characteristics in accordance with the ejection amount ranks are also stored in the storage area in the host PC 200. In FIG. 7C, the horizontal axis represents a signal value inputted for printing, i.e., an input tone value, and the vertical axis represents a print density. The horizontal axis is an 8-bit tone value from 0 to 255. In the tone characteristics in FIG. 7C, the larger the tone value, more dots are printed, or in other words, the higher the print density.

The three tone characteristics 702, 704, 706 in FIG. 7C show tone characteristics for different ejection amount ranks. The tone characteristic 702 shows the relation between an input tone value and a print density for printing with a large ejection amount. The tone characteristic 702 has a higher print density than the tone characteristics 704, 706 on the low tone value side, and the print density is saturated, or in other words, reaches the upper limit of the print density, on the low tone value side of the maximum input tone value. Thus, in a case where the ejection amount or the ejection amount rank estimated in S606 is large, the tone characteristic 702 is selected in S608 as an estimated tone characteristic.

The tone characteristic 704 shows the relation between an input tone value and a print density for printing with an intermediate ejection amount. The tone characteristic 704 has a lower print density than the tone characteristic 702 at every tone value and has a higher print density than the tone characteristic 706 on the low tone value side. In the tone characteristic 704, the print density is at its upper limit at the maximum input tone value. Thus, in a case where the ejection amount or the ejection amount rank estimated in S606 is intermediate, the tone characteristic 704 is selected in S608 as an estimated tone characteristic.

The tone characteristic 706 shows the relation between an input tone value and a print density for printing with a small ejection amount. The tone characteristic 706 has a lower print density than the tone characteristics 702, 704 at every tone value. In the tone characteristic 706, the density value does not reach its upper limit even at the maximum input tone value. Thus, in a case where the ejection amount or the ejection amount rank estimated in S606 is small, the tone characteristic 706 is selected in S608 as an estimated tone characteristic.

In the present embodiment, after one tone test pattern is printed and scanned, ejection amounts are estimated, and then the tone characteristics are estimated. However, the present invention is not limited to this. Specifically, a plurality of test patterns with different tones may be printed and scanned, and tone characteristics may be generated from the scan values thus obtained. In this case, tone characteristics shown in FIG. 7C indicating the relations between an input tone value and a print density can be generated from the relation between a scan value and a print density shown in FIG. 7A.

Figure 8:
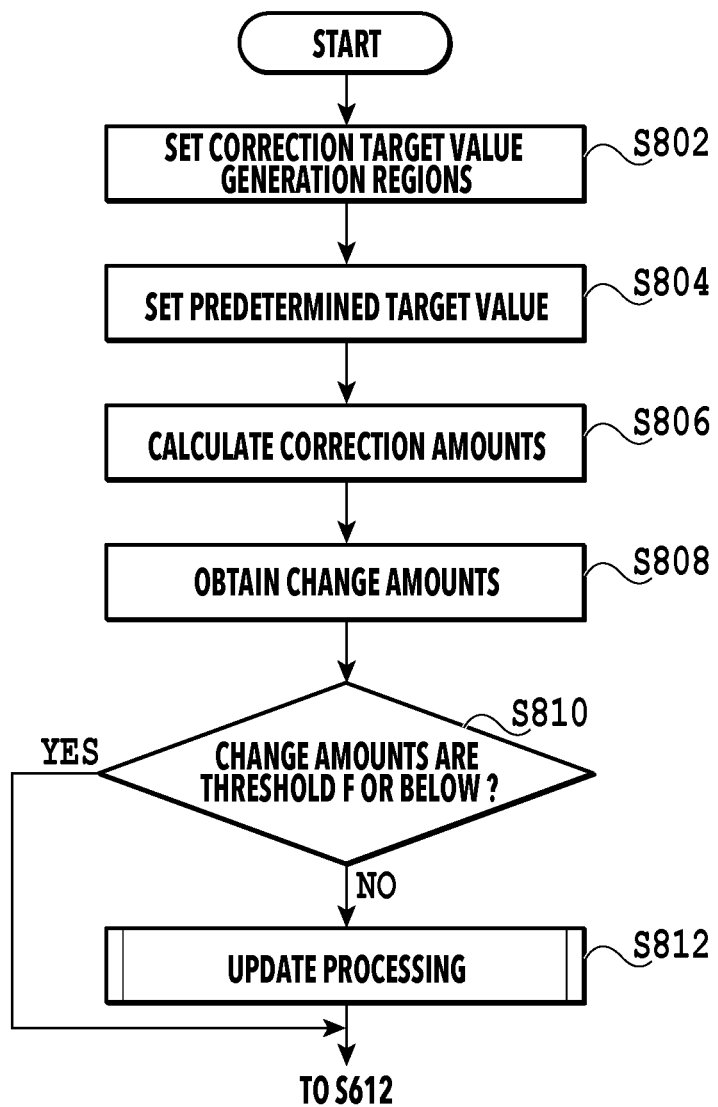
FIG. 8 is a flowchart showing a processing routine of correction target value generation processing.

Referring back to FIG. 6, after the tone characteristics are estimated, next, the main control part 322 performs correction target value generation processing to generate a correction target value for each correction target value generation region, the correction target value serving as a target density value in correction (S610). FIG. 8 is a flowchart showing a processing routine of the correction target value generation processing, which is a sub-routine of the generation processing.

After the correction target value generation processing is started, first, the main control part 322 sets correction target value generation regions for which to generate correction target values (S802). In S802, the print region 212 is divided into a plurality of regions to set the correction target value generation regions 220 (see FIGS. 2A and 2B). The correction target value generation region 220 is, for example, a region corresponding to a plurality of nozzles arranged consecutively and regularly in the X-direction on a chip where the nozzles are formed. Specifically, in a case where the chips 202 are arranged in the print head 102 as shown in FIG. 2A, for example, a region including four nozzles 210 disposed at different positions in the Y-direction and consecutive in the X-direction is set as the correction target value generation region 220. Also, in a case where the chips 204 are arranged in the print head 102 as shown in FIG. 2B, for example, a region including all the nozzles 210 formed on one chip 204 is set as the correction target value generation region 220.

Also, the correction target value generation region 220 is larger than a unit region for which to detect a print density by the scanning of the scanner 106, or in other words, larger than a region for which to generate a correction value for use in the HS processing. For example, the correction target value generation region 220 is an integral multiple of the unit region. The reason why the correction target value generation region 220 is larger than the unit region is because the variance between the nozzles in the chip 202, 204 has a high frequency component. The detection of print densities and the calculation of correction values for use in the HS processing are performed to correct the variance between nozzles in a chip and therefore need to be performed for a small region including several nozzles. By contrast, the calculation of correction target values is performed to reduce low-frequency variance such as variance between chips.

Note that the correction target value generation region 220 and the unit region are each sized to suit the configuration of the printing system 10. The correction target value generation region 220 is set to, for example, several millimeters to several tens of millimeters. The unit region is set to, for example, approximately 0.1 mm which corresponds to several nozzles. The sizes of these regions may be set bigger or smaller depending on, e.g., the computation speed of the host PC 200.

Next, the main control part 322 sets a predetermined correction target value to each correction target value generation region 220 (S804). Then, for each correction target value generation region 220, the main control part 322 calculates a correction amount to be obtained by performing the HS processing using the predetermined correction target value (see FIG. 9) (S806). The predetermined correction target value is a value retained in, e.g., the storage area in the host PC 200. In S804, the same predetermined correction target value is set for all the correction target value generation regions 220. Instead, in S804, predetermined correction target values may be set individually to the correction target value generation regions 220. In S806, correction amounts to be obtained by performing the HS processing using the predetermined correction target value are calculated. More specifically, what is calculated in S806 is the difference between the predetermined target correction value and a print density in each correction target value generation region 220. The print density in each correction target value generation region 220 is a print density obtained from a scan value obtained by the scanner 106 by scanning a printed test pattern. In other words, the print density is obtained from the value scanned in S604.

After that, for each correction target value generation region 220, the main control part 322 obtains an amount of change in print density by the HS processing (S808). Then, the main control part 322 compares the change amount thus obtained with a preset threshold F and determines for each correction target value generation region 220 whether the change amount is equal to or below the threshold F (S810). The change amount set in S808 is the number of dots corresponding to the correction amount calculated in S806, i.e., a difference in density value before and after the HS processing. The threshold F, which is a first threshold, is a value smaller by a predetermined amount than the lower limit value of a difference in the number of dots where a dot-pattern difference is visibly recognizable as unevenness. In other words, the threshold F is the upper limit value of the amount of change in the number of dots where a dot-pattern difference is not visibly recognizable as unevenness. The predetermined amount can be changed appropriately according to, for example, the ink type, the print medium type, and the like.

If it is determined in S810 that the change amounts in the correction target value generation regions 220 are equal to or below the threshold F, the predetermined correction target values are set as is as the correction target values for generating correction values, and processing proceeds to S612. If it is determined in S810 that the change amounts in the correction target value generation regions are not all equal to or below the threshold F, i.e., there is any correction target value generation region in which the change amount is greater than the threshold F, the main control part 322 performs update processing to update the correction target value (S812). Then, after the update processing is complete, processing proceeds to S612. More specifically, if it is determined in in S810 that the change amount is equal to or below the threshold F in all the correction target value generation regions 220, processing proceeds to S612 without going through S812. Meanwhile, if it is determined in S810 that there is even one correction target value generation region 220 in which the change amount is greater than the threshold F, processing proceeds to S812.

Figure 9:
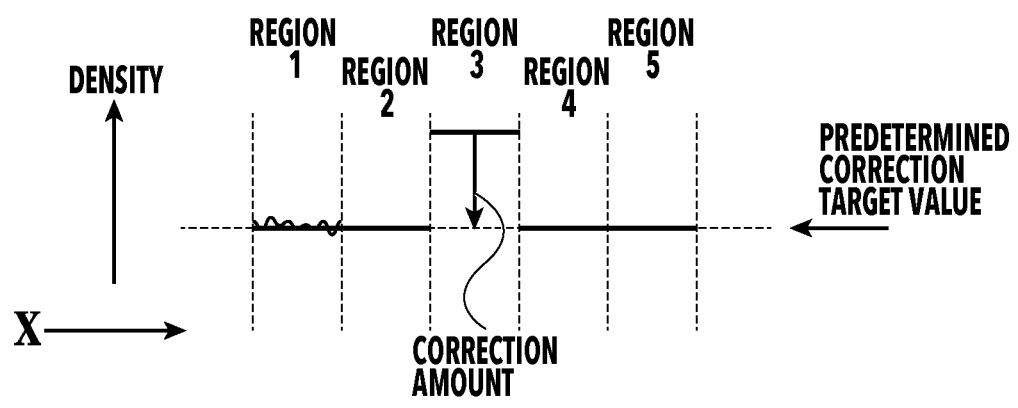
FIG. 9 is a diagram showing print densities in correction target value generation regions.

A case is discussed here where there is a correction target value generation region 220 in which the change amount is greater than the threshold F. FIG. 9 is a diagram showing regions near the correction target value generation region where the change amount is greater than the threshold F. In FIG. 9, regions 1 to 5 represent the correction target value generation regions 220 arranged in the X-direction, and the solid thick lines parallel with the X-direction each represent the print density of ink printed by the nozzles 210 corresponding to the correction target value generation region 220. The print density is calculated from a scan value from the scanner 106 in S402. Also, each region corresponds to a plurality of nozzles and thus has variance between the nozzles, although FIG. 9 shows such variance only in the region 1. The print density shown in FIG. 9 is obtained by averaging the variance in ejection amount between nozzles in the region. The broken line extending in the X-direction denotes the predetermined correction target value.

In FIG. 9, the regions 1, 2, 4, and 5 have almost equal ejection amounts from the corresponding nozzles 210 and hence almost the same print density. By contrast, the region 3 has a large amount of ejection from the corresponding nozzles 210 and therefore has a higher print density than the other regions. The print densities in the regions 1, 2, 4, and 5 are almost equal to the predetermined correction target value, and thus, correction amounts in the HS processing, i.e., increases or decreases in the number of dots are very small. By contrast, the print density in the region 3 is far greater than the predetermined correction target value, and the number of dots needs to be decreased greatly in order for the print density to be brought to the predetermined correction target value. In this case, the amount of change in the number of dots exceeds the threshold F, which is the upper limit value of the amount of change in the number of dots where a dot-pattern difference is not visibly recognizable as unevenness. Thus, in a case where correction is made to bring the region 3 to the predetermined correction target value, a large difference in the number of dots is generated between the region 3 and each of the regions 2, 4 adjacent to the region 3, causing unevenness in spatial frequency in these regions. By contrast, with the correction amount for the region 3 being equal to or below the threshold F, the density difference between the region 3 and each of the regions 2, 4 is unresolved, causing density unevenness in these regions.

Figure 10:
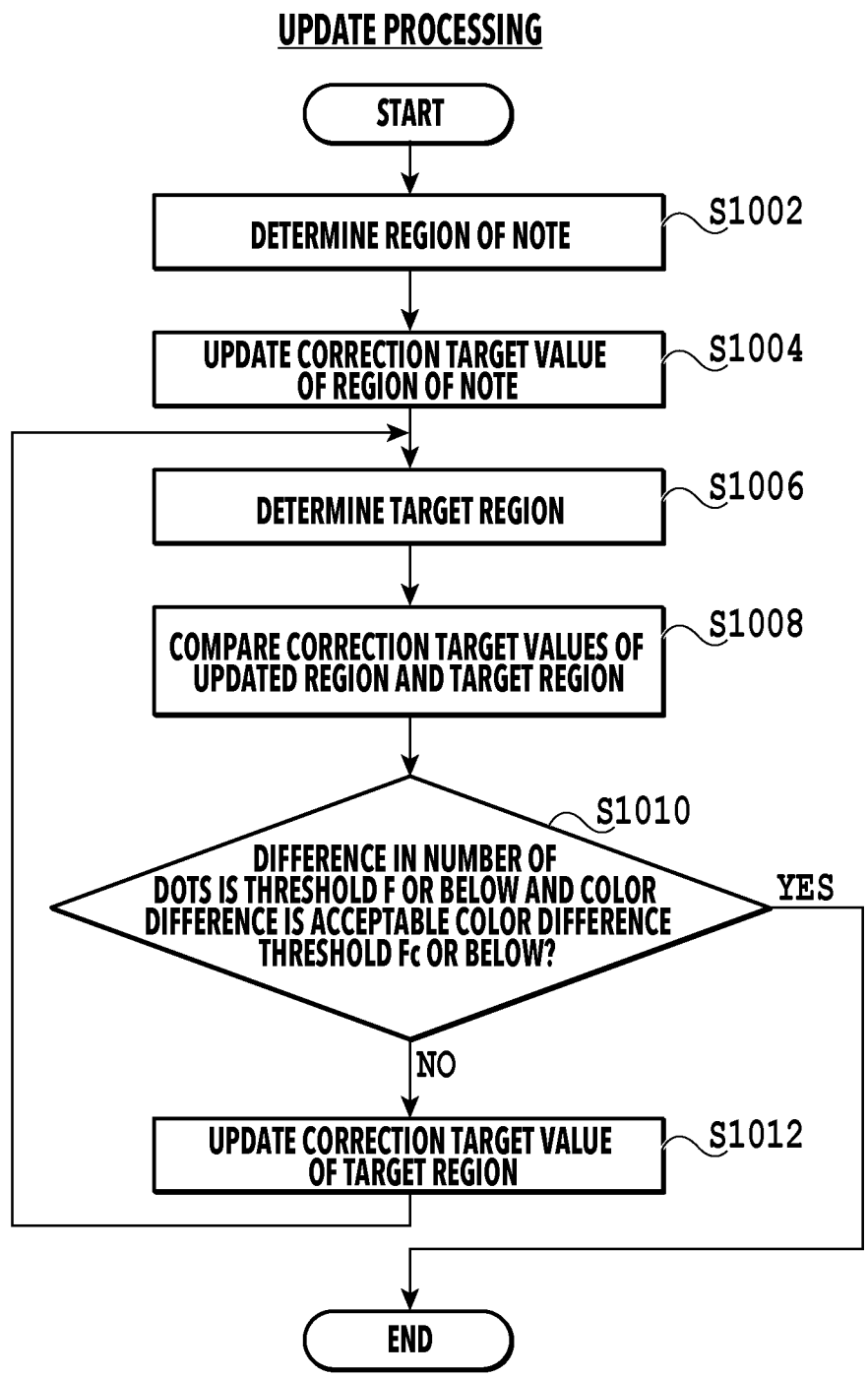
FIG. 10 is a flowchart showing a processing routine of update processing.

Thus, in the present embodiment, if there is any correction target value generation region where the change amount exceeds the threshold F, correction target value update is performed targeting a plurality of regions including the correction target value generation region and its neighboring correction target value generation regions, so that an amount of change between adjacent regions may be the threshold F or below. In other words, in the present embodiment, in the update processing in S812, whether to perform correction target value update is considered targeting the plurality of regions including the correction target value generation region that needs to be changed in the correction target value, and correction target value update is done depending on the result of the consideration. The update processing in S812 is described in detail below with reference to FIG. 10. FIG. 10 is a flowchart showing a processing routine of the update processing, which is a sub-routine of the correction target value generation processing.

After the update processing is started, first, the main control part 322 determines one of the correction target value generation regions 220 as a region of note for which to update the correction target value (S1002). In S1002, the correction target value generation region 220 determined as having a change amount exceeding the threshold F as a result of the comparison in S810 is determined as a region of note. For instance, in FIG. 9, the region 3 is determined as a region of note. In the following description, to facilitate understanding, a case where one correction target value generation region is determined as a region of note is described. Note that in a case where there are more than one correction target value generation region 220 determined as having a change amount exceeding the threshold F, the following processing is executed with those correction target value generation regions 220 being all determined as a region of note.

Next, the main control part 322 updates the correction target value of the region of note from the predetermined correction target value to a new correction target value (S1004). More specifically, in S1004, the main control part 322 performs first update to update a first set correction target value, which is the predetermined correction target value set for the region of note. In S1004, the predetermined correction target value is updated to a first updated correction target value as a new correction target value, the first updated correction target value being a density value closer to the print density than the predetermined correction target value is and being such that a difference in the number of dots printed from the print density is the threshold F or below. The amount of change from the print density to the new correction target value (the first updated correction target value) only needs to be such that a difference in the number of printed dots between the print density and the new correction target value is the threshold F or below, and is, for example, a preset fixed value. Note that the change amount may be a variable value that varies depending on the difference of the print density in the region of note from the predetermined correction target value.

Figure 11A:
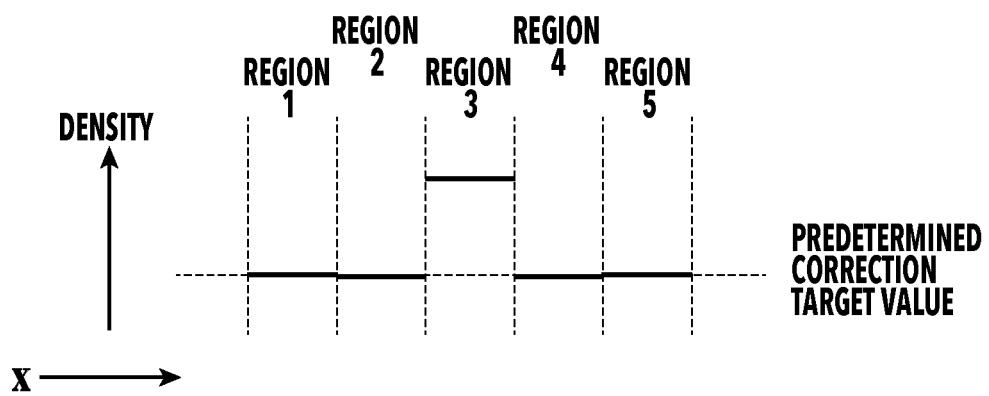
FIGS. 11A and 11B are diagrams illustrating update of a correction target value for a region of note.
Figure 11B:
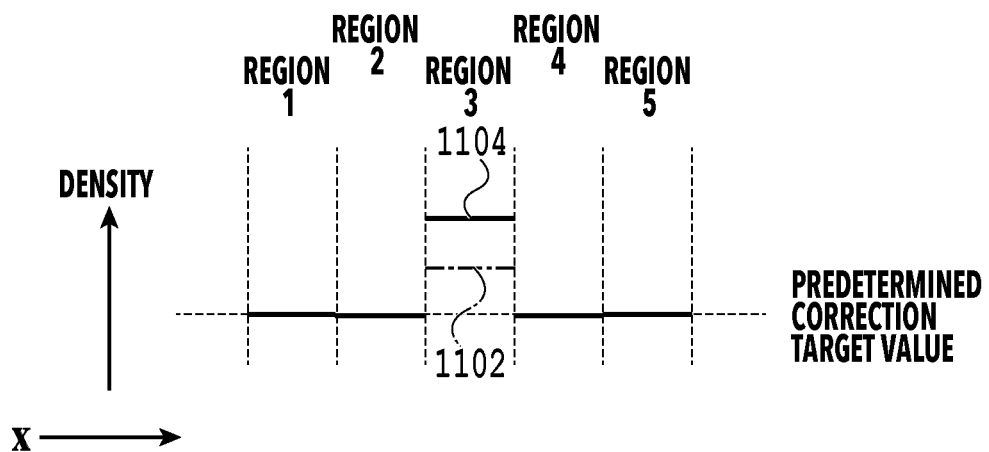

Now, a description is given of print density values and correction target values in the regions near the region of note. FIG. 11A is, like FIG. 9, a diagram showing the print densities in the regions 1 to 5 which are the correction target value generation regions 220. FIG. 11B is a diagram showing a correction target value updated in S1004. In FIG. 11A, only the region 3 has a high print density and is set as a region of note in S1002 because the difference in the number of dots made by bringing the print density to the predetermined correction target value exceeds the threshold F. Then, in S1004, the correction target value for the region 3 is updated from the predetermined correction target value to a new correction target value 1102 as shown in FIG. 11B. The correction target value 1102 is a correction target value used in obtaining a correction value for use in the HS processing for a print density 1104 in the region 3. Thus, as a result of the HS processing, the region 3 will be printed at the print density of the correction target value 1102. In order for the region 3 to be printed at the print density of the correction target value 1102 changed from the print density 1104 by the HS processing, the print density of the correction target value 1102 is a density value obtained by reducing the number of dots corresponding to the print density 1104 by a predetermined number of dots which is the threshold F or below.

Meanwhile, the region 2 adjacent to the region 3, which is the region of note, has a print density equivalent to the predetermined correction target value. Note that the region 2 is determined in S810 as having a change amount being the threshold F or below and is not determined as a region of note in S1002, and the correction target value thereof is therefore not updated in S1004. However, in a case where the predetermined target value for the region 2 and the correction target value 1102 for the region 3 have a density difference such that the difference in the number of dots exceeds the threshold F and have a color difference exceeding an acceptable color difference threshold Fc, the print after the HS processing will have unevenness due to dot pattern difference, unevenness in density, and unevenness in color. The acceptable color difference threshold Fc will be described later. Note that the same applies to the region 4 adjacent to the region 3.

To reduce such unevenness, in the present embodiment, it is considered whether to also update the correction target value for the regions adjacent to the region updated in the correction target value. Specifically, after the correction target value for the region of note is updated in S1004, next, the main control part 322 determines, as a target region, a region which is adjacent to the updated region updated in the correction target value and which is yet to be updated in its correction target value (S1006). After that, the main control part 322 compares the correction target value of the updated region with the correction target value of the target region (S1008). Then, the main control part 322 determines whether the correction target value of the updated region and the correction target value of the target region have a difference in the number of dots equal to or below the threshold F and have a color difference equal to or below the acceptable color difference threshold Fc (S1010).

In a case where the updated region is a region of note (see FIG. 11B), the regions 2 and 4, which are adjacent to the region 3 as the updated region and yet to be updated in their correction target values, are determined as target regions in S1006. Then, in S1008, the correction target value 1102 of the region 3 is compared with the predetermined correction target value of the region 2, which is a target region, and with the predetermined correction target value of the region 4, which is another target region. A case where the updated region is not a region of note, i.e., not the region 3, will be described later. Note that a region updated in its correction target value most recently is set as an updated region in S1006.

If it is determined in S1010 that the correction target value of the updated region and the correction target value of the target region have a difference in the number of dots equal to or below the threshold F and have a color difference equal to or below the acceptable color difference threshold Fc, the update processing ends, and the correction target value generation processing ends. If it is determined in S1010 that the correction target value of the updated region and the correction target value of the target region have a dot count difference not equal to or below the threshold F and/or have a color difference not equal to or below the acceptable color difference threshold Fc, processing proceeds to S1012.

In S1012, the main control part 322 updates the correction target value of the target region to a new correction target value. More specifically, in S1012, second update is performed to update a second set correction target value which is a predetermined correction target value set for the target region. A second updated correction target value which is a new correction target value set for the target region is located closer to the predetermined correction target value (the second set correction target value) than the correction target value of the updated region is. The density value is set so that, compared to the correction target value of the updated region, a difference in the number of dots may be the threshold F or below and that the color difference may be the acceptable color difference threshold Fc or below.

Figure 12A:
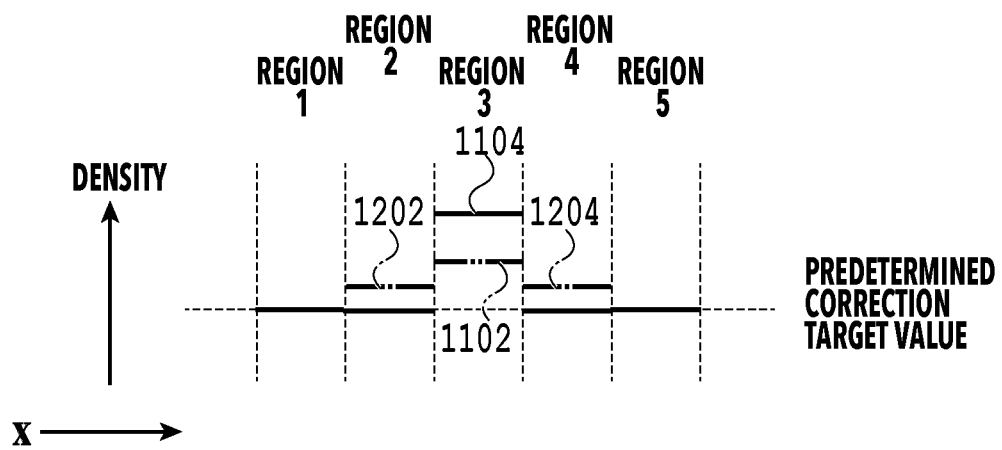
FIGS. 12A and 12B are diagrams illustrating update of correction target values for target regions.

For example, in the case in FIG. 11B, in S1012, the correction target values for the regions 2 and 4 are updated. FIG. 12A is a diagram showing new correction target values for these target regions. In this case, a density value set as a new correction target value 1202 for the region 2 in S1012 is closer to the predetermined correction target value than the correction target value 1102 is and is such that, compared to the correction target value 1102, the difference in the number of dots is the threshold F or below and the color difference is the acceptable color difference threshold Fc or below. Then, the correction target value for the region 2 is updated from the predetermined correction target value to the correction target value 1202. Similarly, a density value set as a new correction target value 1204 for the region 4 is closer to the predetermined correction target value than the correction target value 1102 is and is such that, compared to the correction target value 1102, the difference in the number of dots is the threshold F or below and the color difference is the acceptable color difference threshold Fc or below. Then, the correction target value for the region 4 is updated from the predetermined correction target value to the correction target value 1204.

Note that if it is determined in S1010 that the correction target value of every target region and the correction target value of the updated region have a difference in the number of dots equal to or below the threshold F and a color difference equal to or below the acceptable color difference threshold Fc, the update processing ends. If there is even one target region that has a correction target value such that the correction target value and the correction target value of the updated region have a difference in the number of dots equal to or below the threshold F and/or a color difference equal to or below the acceptable color difference threshold Fc, processing proceeds to S1012.

After that, processing proceeds to S1006 to perform the processing of and after S1006. Specifically, as shown in FIG. 12A, immediately after the correction target values for the regions 2 and 4 are updated, the updated region in S1006 is the regions 2 and 4, and thus, the regions 1 and 5 are determined as target regions because they are adjacent to the regions 2 and 4 and are yet to be updated in their correction target values. Thus, the region 3 which has already been updated in its correction target value is excluded from the target regions. Then, in S1008, the correction target value 1202 for the region 2 is compared with the predetermined correction target value for the region 1, which is a target region, and also, the correction target value 1204 for the region 4 is compared with the predetermined correction target value for the region 5, which is another target region. Then, processing after S1010 is executed.

Figure 12B:
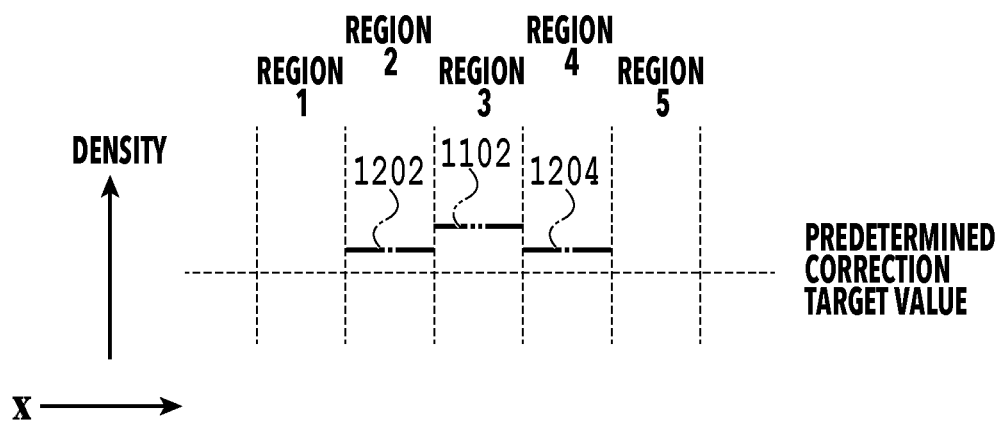

FIG. 12B is a diagram corresponding to FIG. 12A and showing the distribution of the correction target values of the respective regions updated by the update processing. In FIG. 12B, the regions 2, 3, and 4 are updated in their correction target values. Each of the updated correction target values is such that, compared to the correction target value for its adjacent region, the difference in the number of dots is the threshold F or below and the color difference is the acceptable color difference threshold Fc or below. Thus, because HS processing is performed using the correction values calculated based on the updated correction target values, the print result can have less unevenness in density, unevenness in color, unevenness in spatial frequency due to a difference in dot pattern, and the like.

The acceptable color difference threshold Fc as the second threshold is now described. To a human eye, it is easier to sense a color difference between regions adjacent to each other and is harder to sense a color difference between regions apart from each other. A color difference tolerance is generally ranked as shown in FIG. 13. FIG. 13 is a table showing, in relation to each rank of color difference tolerance, the range of a color difference ΔE and the perceptibility of the color difference. The color difference ΔE is calculated in accordance with a publicly known formula by CIE-L*a*b*.

According to the ranks in FIG. 13, in the tolerance rating "AA," a slight color difference is sensed in a case where the colors compared are adjacent to each other, and in the upper tolerance rating "AAA," a strict acceptable color difference standard can be set. Thus, the color difference being the acceptable color difference threshold Fc or below is preferably such that the color difference ΔE is, for example, 0.8 or below, 0.8 being the upper limit of the tolerance rating "AAA." Specifically, making the color difference of the correction target values between the region 1 and the region 2, between the region 2 and the region 3, between the region 3 and the region 4, and between the region 4 and the region 5 0.8 or below makes the color difference between adjacent regions less noticeable and therefore makes unevenness in color less noticeable.

Although the update processing described above obtains a new correction target value for an adjacent region based on conditions including the acceptable color difference threshold Fc, the present invention is not limited to this. For example, an acceptable color difference threshold may also be provided for correction target values for regions apart from each other, such as the region 1 and the region 3. For example, according to the ranks in FIG. 13, the tolerance rating "A" is a level where the color difference is almost unnoticeable in a case where the colors compared are apart from each other. Thus, in updating a correction target value for a target region, a correction target value for a region apart therefrom is taken into consideration, and the correction target value for the target region is updated to a correction target value such that the color difference between these correction target values is a third threshold or below. The color difference being the third threshold or below is such that the color difference ΔE is, for example, 3.2 or below from the table in FIG. 13, 3.2 being the tolerance rating "A."

Referring back to FIG. 6, after the correction target values are generated for the respective correction target value generation regions in S610, the main control part 322 next generates, on a unit region basis, correction values for use in the HS processing in accordance with the correction target values (S612), and the generation processing as the correction value generation processing ends. In S612, as a correction target value for a unit region, a correction target value set for a correction target value generation region 220 including the unit region is used. The generated correction value is a correction value for correcting an ink color signal value so that an HS color signal value based on the correction target value may be obtained in the HS processing in S508. In other words, the correction value is a value for bringing the color and density of ink to be printed based on print data obtained by image processing to the correction target value.

Figure 14A:
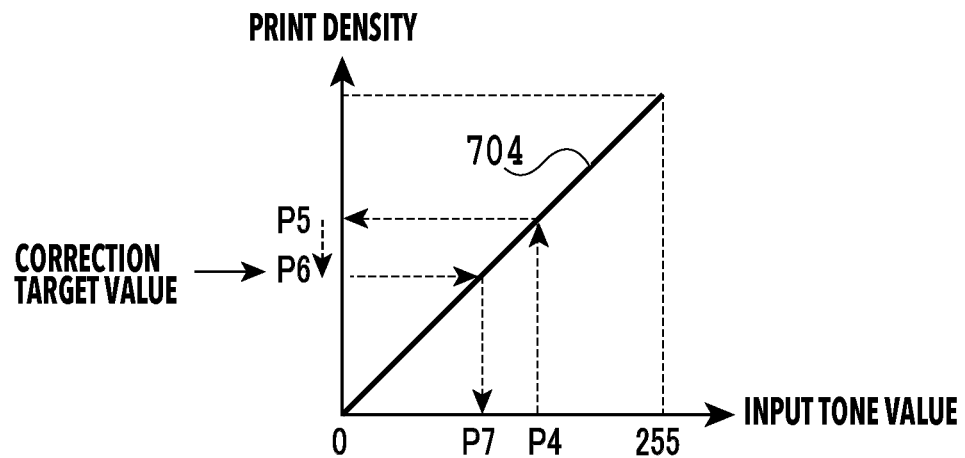
FIGS. 14A and 14B are diagrams illustrating a method for obtaining a correction value.
Figure 14B:
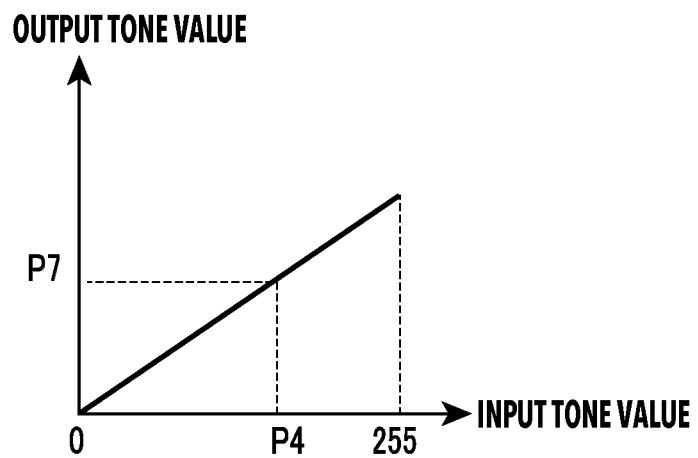

FIG. 14A is a diagram showing the tone characteristic 704, and FIG. 14B is a diagram showing an example of a one-dimensional LUT which is a correction value for use in the HS processing. Assume here that a correction target value to be printed in response to an input tone value P4 is P6 and that the tone characteristic 704 is estimated in S608 as a tone characteristic of the unit region for which to determine a correction value. Because printing is performed at a print density P5 in response to the input tone value P4 according to the tone characteristic 704, it is necessary to perform conversion so that printing may be performed at the print density P6. Specifically, a correction value is generated which determines the relation between an input tone value and an output tone value, the relation being for converting the input tone value P4 into an input tone value P7 that gives the print density P6 which is the correction target value. In other words, in the above case, a one-dimensional LUT shown in FIG. 14B, which is a conversion table for converting the input tone value P4 to the output tone value P7, is generated in S612 as a correction value.

As thus described, in a case where the difference in the number of dots between a print density based on a value scanned from a test pattern and a set correction target value exceeds the threshold F, the host PC 200 updates the correction target value. The new updated correction target value is such that its difference in the number of dots from the pre-update correction target value is the threshold F or below.

Moreover, a region which is adjacent to an updated region updated in the correction target value and which is yet to be updated in the correction target value is set as a target region, and the correction target value of the updated region and the correction target value of the target region are compared with each other. Then, in a case where the correction target values thus compared satisfy at least one of the condition that the difference in the number of dots exceeds the threshold F and the condition that the color difference exceeds the acceptable color difference threshold Fc, the correction target value of the target region is updated. Consequently, the updated correction target value of the target region has, compared to the updated correction target value of the updated region, a difference in the number of dots equal to or below the threshold and a color difference equal to or below the acceptable color difference threshold.

In a conventional HS correction technique, the correction amount of each individual correction region does not depend on the density values of other regions. Thus, a correction amount is small for a region exhibiting a density value close to its correction target value before correction, giving almost no correction in some cases. In the present invention, a correction amount for a region of note is determined depending on the density value of the region of note and the density value of another region different from the region of note. For this region, a region exhibiting a density value which requires almost no correction is also targeted for correction.

Thus, in a print result printed based on print data generated by image processing, not only density unevenness and color unevenness due to the ejection characteristics of the nozzles, but also unevenness in spatial frequency due to HS processing can be reduced. Also, because unevenness is reduced by the update of the correction target values as described above, the above unevenness can be reduced irrespective of the configuration of the print head.

Other Embodiments

Note that the above embodiment may be modified as shown in points (1) to (6) below.

(1) Although not particularly described in the above embodiment, in S1002 of the update processing, in a case where more than one correction target value generation region 220 is determined as having a change amount exceeding the threshold F, a region of note is first set to, for example, a region having a print density which is farthest away from the correction target value. Then, after completion of the update of the correction target value for the region of note and a correction target value for a target region corresponding to the region of note, a region having a print density which is the second farthest away from the correction target value and having yet to be updated in its correction target value is set as a region of note. This enables efficient update of correction target values for the correction target value generation regions. Note that the method for determining a region of note is not limited to this, and an approach may be employed where all the regions are processed in many combinations and optimized based on their print densities, the threshold F, and the acceptable color difference threshold Fc.

(2) Although not described particularly in the above embodiment, the threshold F and the acceptable color difference threshold Fc may be variable according to conditions such as an ink color or an input tone value or may be fixed irrespective of these conditions. For example, even with the same color difference in measurement, there are colors whose color difference is easily sensible and colors whose color difference is less sensible to a human eye. Thus, the threshold F and the acceptable color difference threshold Fc may be changed according to the ink color or input tone value based on the sensibility to a human eye.

In general, it is hard for a human eye to sense a color difference in colors with high brightness and color with high chromaticness. Thus, the acceptable color difference threshold Fc may be increased for colors with high brightness and colors with high chromaticness. Colors for which the acceptable color difference threshold Fc can be increased are, for example, bright colors, such as yellow, having a light tone close to white. Alternatively, with cyan or magenta, a high tone part where a large amount of ink is applied has higher chromaticness than a low tone part, and it is hard for a human eye to perceive the color difference. Thus, the acceptable color difference threshold Fc can be increased for such a part.

Also with the threshold F, it depends on the print conditions and ink color whether or not it is easy for a human eye to sense the density unevenness. Thus, the threshold F may be changed depending on the print conditions and ink color. For example, for a low tone with almost no dots, a pattern difference cannot be sensed with a little change in the number of dots. Also, for a high tone with a large number of dots, there is not enough unprinted region for a dot pattern to be seen, and therefore, a pattern difference cannot be sensed with a little change in the number of dots. Also, a dot pattern is less noticeable on a print medium susceptible to smearing, like plain paper, than on a print medium less susceptible to smearing, like gloss paper. For this reason, a larger threshold F may be set for conditions under which a dot pattern is less noticeable, such as the characteristics of a print medium, tone, and color.

(3) In the above embodiment, a correction target value is determined for each correction target value generation region 220 based on the ejection characteristics of the nozzles 210 forming the print heads 102. However, the present invention is not limited to this. Unevenness may also occur due to, e.g., the characteristics of conveyance of a print medium, i.e., variance in the operation of the conveyance roller or the conveyance motor, or the characteristics of a print medium, i.e., what is called cockling, which is ripples in the print medium M caused by application of ink. In other words, an image formed on a print medium may have not only density unevenness due to variance in the ejection characteristics of nozzles, but also density unevenness due to operational variance caused by, for example, eccentricity of the conveyance roller caused in the Y-direction. Density unevenness also occurs due to cockling caused by shrinkage of paper fibers in a print medium by water absorption. Thus, the correction target values may be determined according to the operational variance and the cockling.

Figure 15:
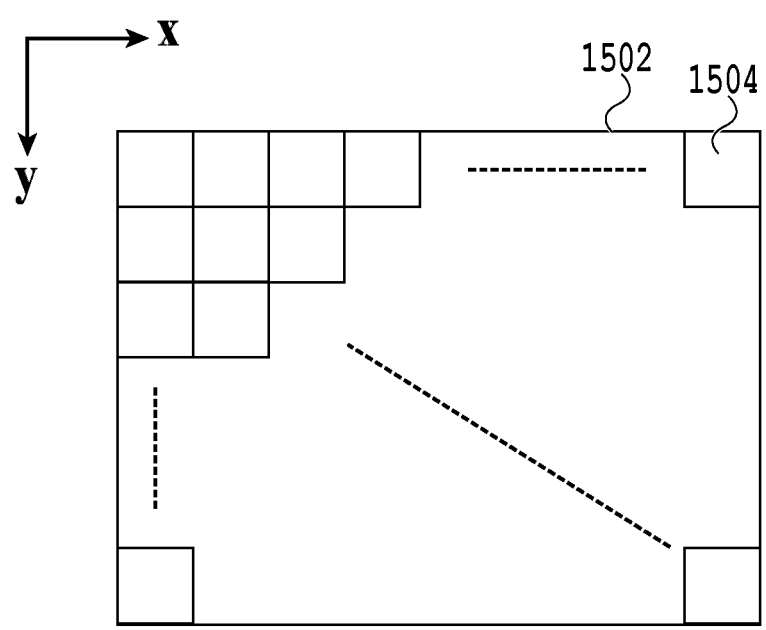
FIG. 15 is a diagram showing a modification of the correction target value generation region.

In this case, a whole print region 1502 is divided in the X-direction and the Y-direction to create correction target value generation regions 1504 (see FIG. 15). FIG. 15 is a diagram showing a modification of the correction target value generation region. The generation processing is performed in a manner similar to the above embodiment, but regions set as target regions in the update processing are regions adjacent to an updated region not only in the X direction, but also in the Y-direction.

(4) In the above embodiment, the host PC 200 as the image processing apparatus generates print data by performing image processing including the HS processing on image data, and also, generates correction values for use in the HS processing in accordance with variance in the print characteristics including ink ejection characteristics. However, such functions of the image processing apparatus may be implemented by a plurality of apparatuses including the host PC 200. For example, the image processing apparatus of the present embodiment only needs to have at least the function of generating correction target values for obtaining correction target values for use in the HS processing, and all or some of the other configurations may be implemented by other apparatuses. Also, although the printing apparatus 100 and the host PC 200 are provided separately above, the present invention is not limited to this. The printing apparatus 100 may include the various functions of the host PC 200 as the image processing apparatus.

(5) The correction target value generation region 220 is an integral multiple of the unit region in the present embodiment. However, the correction target value generation region 220 is not limited to this and does not have to be an integral multiple of the unit region. In this case, some unit regions overlap with two correction target value generation regions 220 at the location of their border position. For such a unit region, a correction target value is set based on the correction target values set for the two correction target value generation regions and the ratio between the correction target value generation regions with respect to the unit region.

(6) The above embodiment and various modes shown in (1) to (5) may be combined appropriately.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s)

and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-116925, filed Jul. 15, 2021, which is hereby incorporated by reference herein in its entirety.

What is claimed is:

1. An image processing apparatus comprising:
   (a) a memory and one or more processors, (b) circuitry, or (c) circuitry, a memory, and one or more processors, configured to operate as a plurality of units comprising:
   (1) an obtainment unit configured to obtain a print density in a unit region corresponding to one or a plurality of nozzles that eject ink, the print density being based on print characteristics; and
   (2) a correction target value generation unit configured to generate a correction target value based on the print density obtained by the obtainment unit, the correction target value serving as a target density value in generating a correction value for use in head shading processing,
   wherein the correction target value generation unit performs (1) a first update to update a first set correction target value set for a correction target value generation region including the unit region, based on a difference between the first set correction target value and the print density in the unit region corresponding to the correction target value generation region and (2) a second update to update a second set correction target value set for the correction target value generation region being adjacent to an updated region which is the correction target value generation region updated in the correction target value and having yet to be updated in the correction target value, based on a difference between the second set correction target value and a first updated correction target value which is the updated correction target value of the updated region, and
   wherein in the first update, in a case where a difference in a number of dots printed between the first set correction target value and the print density in the unit region corresponding to the correction target value generation region for which the first set correction target value is set exceeds a first threshold, the first set correction target value is updated to a first updated correction target value which is closer to the print density than the first set correction target value is and is such that the difference in the number of dots from the print density is the first threshold or below.

2. The image processing apparatus according to claim 1, wherein in a case where there are a plurality of the correction target value generation regions where a difference between the number of dots based on the first set correction target value and the number of dots based on the print density in the unit region corresponding to the correction target value generation region for which the first set correction target value is set exceeds the first threshold, the correction target value generation unit performs the correction target value update starting from the correction target value generation region where the difference is largest.

3. The image processing apparatus according to claim 1, wherein in the second update, in a case where at least one of a condition that the difference in the number of dots printed between the first updated correction target value and the second set correction target value exceeds the first threshold and a condition that a color difference between the first updated correction target value and the second set correction target value exceeds a second threshold is satisfied, the second set correction target value is updated to a second updated correction target value which is closer to the second set correction target value than the first updated correction target value is and is such that the difference in the number of dots from the first updated correction target value is the first threshold or blow and that the color difference from the first updated correction target value is the second threshold or below.

4. The image processing apparatus according to claim 3, wherein the second threshold is a color difference ΔE of 0.8.

5. The image processing apparatus according to claim 3, wherein the correction target value generation unit obtains the second updated correction target value so that a color difference between the correction target value generation regions spaced apart from each other is a third threshold or below.

6. The image processing apparatus according to claim 5, wherein the third threshold is a color difference ΔE of 3.2.

7. The image processing apparatus according to claim 3, wherein the second threshold varies depending on brightness, chromaticness, and a tone value of ink.

8. The image processing apparatus according to claim 1, wherein the first threshold varies depending on a tone value, an ink color, and a characteristic of a print medium.

9. The image processing apparatus according to claim 1, wherein the print characteristic includes an ink ejection characteristic of each nozzle, a characteristic of conveyance of a print medium, and a characteristic of the print medium.

10. The image processing apparatus according to claim 1, wherein the correction target value generation region is formed by division in a first direction in which nozzle arrays are arranged or division in the first direction and in a second direction intersecting with the first direction.

11. The image processing apparatus according to claim 1, wherein the correction target value generation region is a region larger than the unit region and corresponding to a plurality of nozzles arranged regularly and consecutively in a predetermined direction.

12. The image processing apparatus according to claim 1, wherein the plurality of units further comprises a correction value generation unit configured to generate the correction value for each unit region based on the correction target value for the correction target value generation region.

13. The image processing apparatus according to claim 1, wherein the plurality of units further comprises a print data generation unit configured to generate print data based on image data, the print data indicating ejection or non-ejection of ink from each nozzle with respect to a pixel,
   wherein in generating the print data, the print data generation unit performs head shading processing using the correction value generated based on the correction target value generated by the correction target value generation unit.

14. The image processing apparatus according to claim 1, further comprising a print unit configured to perform wherein a print head performs printing by ejecting ink from the nozzles.

15. The image processing apparatus according to claim 14, further comprising a scanner configured to be able to scan an image printed by the print head.

16. An image processing method in which a correction target value serving as a target density value in generating a correction value for use in head shading processing is generated based on a print density in a unit region corresponding to one or a plurality of nozzles that eject ink, the print density being based on print characteristics, the image processing method comprising:
   updating a first set correction target value set for a correction target value generation region including the unit region, based on a difference between the first set correction target value and the print density in the unit region corresponding to the correction target value generation region; and
   updating a second set correction target value set for the correction target value generation region being adjacent to an updated region which is the correction target value generation region updated in the correction target value and having yet to be updated in the correction target value, based on a difference between the second set correction target value and a first updated correction target value which is the updated correction target value of the updated region,
   wherein in the updating the first set correction target value, in a case where a difference in a number of dots printed between the first set correction target value and the print density in the unit region corresponding to the correction target value generation region for which the first set correction target value is set exceeds a first threshold, the first set correction target value is updated to a first updated correction target value which is closer to the print density than the first set correction target value is and is such that the difference in the number of dots from the print density is the first threshold or below.

17. A non-transitory computer-readable storage medium storing a program for causing a computer to function, by using (a) a memory and at least one processor, (b) circuitry, or (c) circuitry, a memory, and at least one processor, as a plurality of units comprising:
   an obtainment unit configured to obtain a print density in a unit region corresponding to one or a plurality of nozzles that eject ink, the print density being based on print characteristics; and
   a correction target value generation unit configured to generate a correction target value based on the print density obtained by the obtainment unit, the correction target value serving as a target density value in generating a correction value for use in head shading processing,
   wherein the correction target value generation unit performs (1) a first update to update a first set correction target value set for a correction target value generation region including the unit region, based on a difference between the first set correction target value and the print density in the unit region corresponding to the correction target value generation region and (2) a second update to update a second set correction target value set for the correction target value generation region being adjacent to an updated region which is the correction target value generation region updated in the correction target value and having yet to be updated in the correction target value, based on a difference between the second set correction target value and a first updated correction target value which is the updated correction target value of the updated region, and
   wherein in the first update, in a case where a difference in a number of dots printed between the first set correction target value and the print density in the unit region corresponding to the correction target value generation region for which the first set correction target value is set exceeds a first threshold, the first set correction target value is updated to a first updated correction target value which is closer to the print density than the first set correction target value is and is such that the difference in the number of dots from the print density is the first threshold or below.

* * * * *